(12) United States Patent
Yeh et al.

(10) Patent No.: US 9,037,773 B2
(45) Date of Patent: May 19, 2015

(54) METHODS FOR PROCESSING AND ADDRESSING DATA BETWEEN VOLATILE MEMORY AND NON-VOLATILE MEMORY IN AN ELECTRONIC APPARATUS

(75) Inventors: Hsin-Chung Yeh, Hsinchu (TW); Cheng Huang Wu, Kaohsiung (TW)

(73) Assignee: MEDIATEK INC., Hsin-Chu (TW)

( * ) Notice: Subject to any disclaimer, the term of this patent is extended or adjusted under 35 U.S.C. 154(b) by 1617 days.

(21) Appl. No.: 12/335,599

(22) Filed: Dec. 16, 2008

(65) Prior Publication Data

US 2010/0153619 A1    Jun. 17, 2010

(51) Int. Cl.
  *G06F 12/02* (2006.01)
  *G06F 9/445* (2006.01)
  *G06F 9/32* (2006.01)

(52) U.S. Cl.
  CPC . *G06F 8/65* (2013.01); *G06F 9/328* (2013.01)

(58) Field of Classification Search
  USPC ........... 711/202–203, 206; 712/211, 230, 243
  See application file for complete search history.

(56) References Cited

U.S. PATENT DOCUMENTS

| | | | | |
|---|---|---|---|---|
| 5,896,393 | A  * | 4/1999 | Yard et al. | 714/710 |
| 6,260,157 | B1 * | 7/2001 | Schurecht et al. | 714/6.13 |
| 7,127,718 | B1 * | 10/2006 | Gavlik et al. | 718/107 |
| 7,739,469 | B2 * | 6/2010 | Jessani et al. | 711/165 |
| 2003/0217227 | A1 * | 11/2003 | Parthasarathy et al. | 711/118 |
| 2007/0245092 | A1 * | 10/2007 | Yeh | 711/147 |

* cited by examiner

*Primary Examiner* — Aimee Li
*Assistant Examiner* — Nicholas Simonetti
(74) *Attorney, Agent, or Firm* — McClure, Qualey & Rodack, LLP

(57) ABSTRACT

An electronic apparatus is disclosed. The electronic apparatus comprises a random access memory (RAM), a read-only memory (ROM) and a processing unit. The RAM stores a call transfer table, wherein the call transfer table comprising at least one transferred address in the RAM. The ROM stores at least one code to call one address of the call transfer table. The processing unit executes the code in the ROM and reads the transfer table accordingly, then transfers to run the data in the transferred address of the RAM.

19 Claims, 8 Drawing Sheets

METHODS FOR PROCESSING AND ADDRESSING DATA BETWEEN VOLATILE MEMORY AND NON-VOLATILE MEMORY IN AN ELECTRONIC APPARATUS

BACKGROUND OF THE INVENTION

1. Field of the Invention

The invention relates to a data processing and addressing method, and more particularly, to methods for processing and addressing data in an electronic apparatus with volatile memory and non-volatile memory.

2. Description of the Related Art

In electronic apparatuses, such as a computer system or an embedded system, various memory devices are commonly utilized. In such apparatuses, codes executed by a processing unit may be stored in a random access memory (RAM) or a read-only memory (ROM). Size of the ROM is normally smaller than that of the RAM, and the power consumption of the ROM is less than that of RAM. The RAM, however, is more flexible than the ROM. In general, fixed and not often modified functions or codes are stored in the ROM but new functions or often changing functions and patch functions/codes are stored in the RAM. Some of the functions in the ROM may call a function in the RAM such that the execution of the ROM function is jumped to a calling address of the RAM function. The codes in the ROM can not be modified but the codes in the RAM can be modified such that the calling address of the RAM function may be changed to another address. Therefore, when the RAM function called by the ROM function has been accessed, unexpected operation result may be obtained.

BRIEF SUMMARY OF THE INVENTION

An embodiment of the invention provides an electronic apparatus. The electronic apparatus comprises a random access memory (RAM), a read-only memory (ROM) and a processing unit. The RAM stores a call transfer table, wherein the call transfer table comprising at least one transferred address in the RAM. The ROM stores at least one code to call one address of the call transfer table. The processing unit executes the code in the ROM and reads the transfer table accordingly, then transfers to run the data in the transferred address of the RAM.

Another embodiment of the invention provides a data processing method for use in an electronic apparatus having a ROM and a RAM. The RAM stores a call transfer table comprising at least one transferred address in the RAM. The method comprises the following steps. A ROM code is first executed to run data in an address of the call transfer table. It is then transferred to run a transferred address according to the call transfer table. Next, the data in the transferred address of the RAM is executed.

Another embodiment of the invention provides an addressing method for use in an electronic apparatus having a processing unit, a ROM and a RAM. The method comprises the following steps. A call transfer table that has a plurality of table indices each identified with a first address of a corresponding VM code is provided in the RAM. At least one NVM code in the ROM identified with one of the table indices is addressed and executed by referring to the identified table index to obtain the first address of the corresponding VM code, wherein the first address of the corresponding VM code is dynamically adjusted according to the current address of the corresponding VM code.

BRIEF DESCRIPTION OF THE DRAWINGS

The invention can be more fully understood by reading the subsequent detailed description and examples with reference to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

The invention is now described with reference to FIGS. 1 through 7, which generally relate to processing data between a non-volatile memory (e.g. ROM) and a volatile memory (e.g. RAM). In the following detailed description, reference is made to the accompanying drawings which form a part hereof, shown by way of illustration of specific embodiments. These embodiments are described in sufficient detail to enable those skilled in the art to practice the invention, and it is to be understood that other embodiments may be utilized and that structural, logical and electrical changes may be made without departing from the spirit and scope of the invention. The following detailed description is, therefore, not to be taken in a limiting sense. It should be understood that many of the elements described and illustrated throughout the specification are functional in nature and may be embodied in one or more physical entities or may take other forms beyond those described or depicted.

The invention provides a data processing method for processing data in an apparatus. The apparatus comprises at least one non-volatile memory and volatile memory. A mapping table that has a plurality of table indices each identified with a first address of a corresponding VM code in the volatile memory is provided. Next, each calling address of the corresponding VM code in the non-volatile memory is replaced with a corresponding table index. Then, each of the first addresses of the corresponding VM code is obtained according to the corresponding table index for executing the corresponding VM code, wherein the first address of the corresponding VM code is dynamically adjusted according to the current address of the corresponding VM code.

Figure 1:
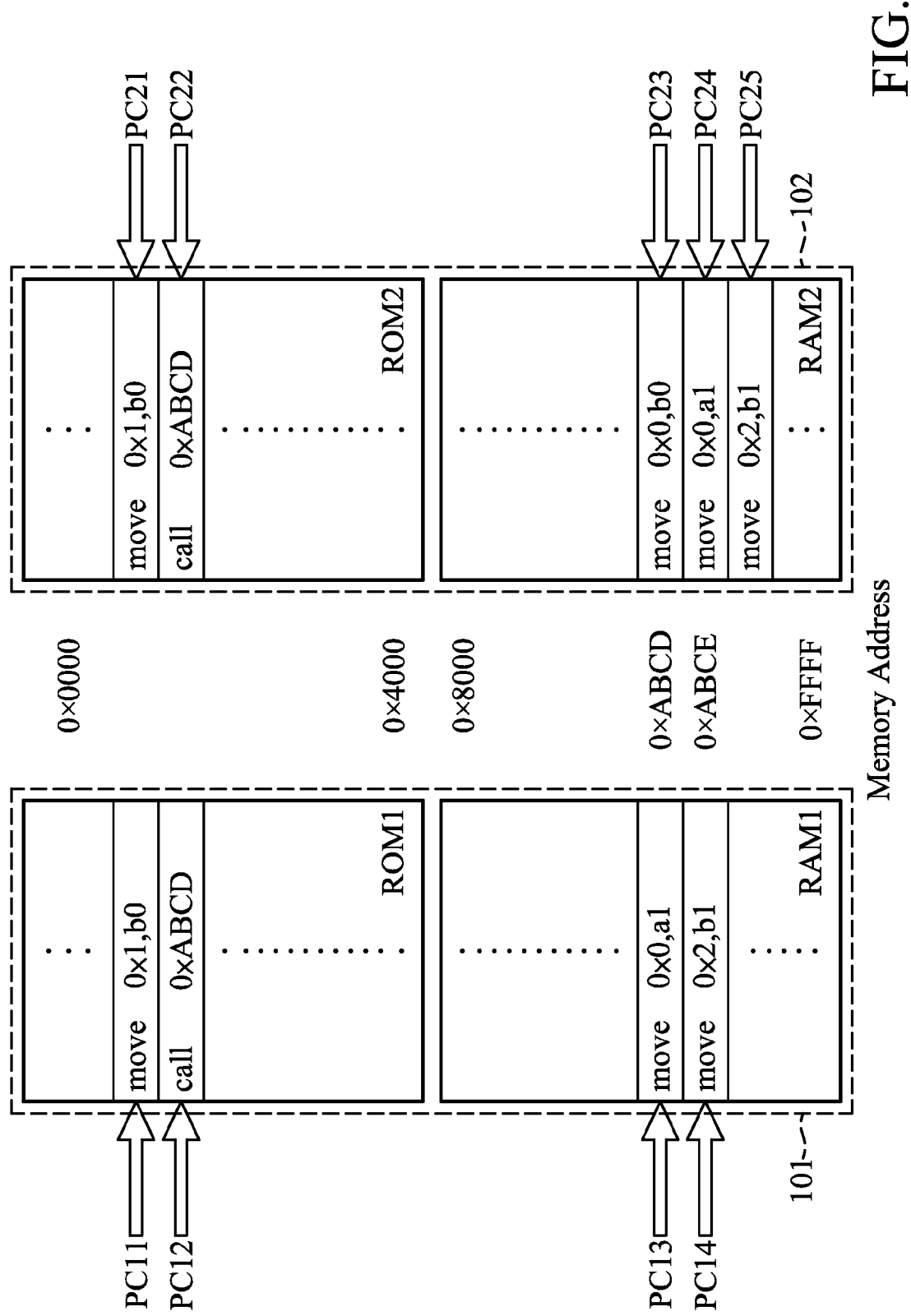
FIG. 1 is a schematic illustrating an embodiment of a data processing between ROM and RAM.

FIG. 1 is a schematic illustrating an embodiment of a data processing between ROM and RAM. As shown in FIG. 1, memory configurations 101 and 102 are respectively illustrated. Each of the memory configurations 101 and 102 comprises an area of non-volatile memory address and an area of volatile memory address. For example, memory addresses of non-volatile memory ROM1 ranges from memory address 0x0000 to 0x4000 and memory addresses of volatile memory RAM1 ranges from memory address 0x8000 to 0xFFFF as shown in FIG. 1. To show operating sequence, a program counter which is identified with a memory address currently being executed is utilized. The content or code within the non-volatile memory is referred to as a NVM code while the content or code within the volatile memory is referred to as a VM code. The NVM codes in the ROM1 are same as that of ROM2. In the memory configuration 101, the execution sequence is PC11, PC12, PC13 and PC14 accordingly. After the execution, the result of the register b0, a1 and b1 are 1, 0 and 2, respectively. In the memory configuration 102, the execution sequence is PC21, PC22, PC23 and PC24, accordingly. After the execution, however, the result of the register b0 becomes 0 due to the call address 0xABCD being replaced by another instruction (i.e. "move 0x0, b0"). Although the call address of the RAM function has been changed, the call address of the ROM function in the ROM2 remains unchanged, causing unexpected results.

Figure 2:
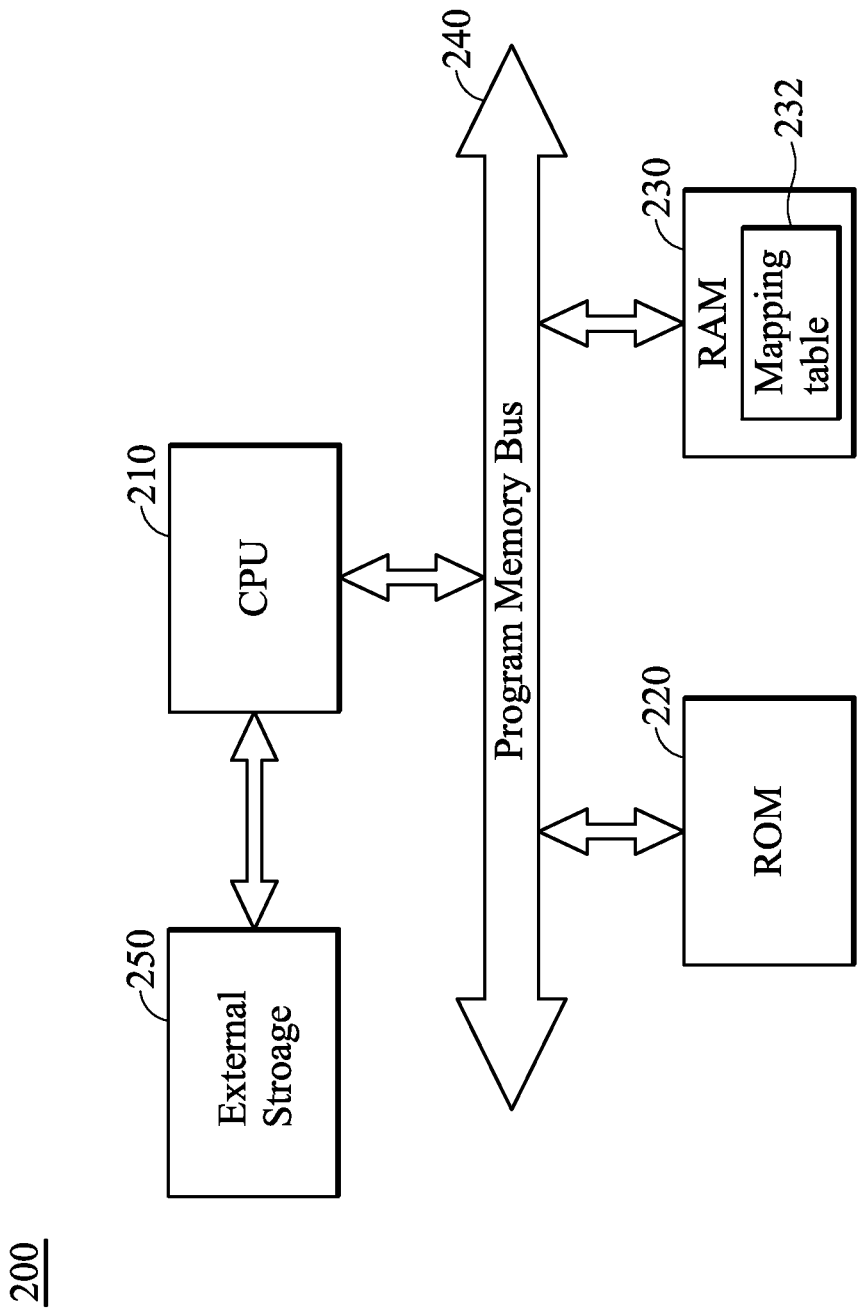
FIG. 2 is block diagram showing an embodiment of an electronic apparatus for processing data between ROM and RAM according to the invention.

FIG. 2 is block diagram showing an embodiment of an electronic apparatus 200 for processing data between ROM and RAM according to the invention. The electronic apparatus 200 comprises a processing unit (CPU) 210, a non-volatile memory (ROM) 220, a volatile memory (RAM) 230 and an external storage 250. The processing unit (CPU) 210 is connected to the non-volatile memory (ROM) 220 and the volatile memory (RAM) 230 via a connecting interface (such as program memory bus) 240. The volatile memory 230 is preferably a random access memory (RAM) while the non-volatile memory 220 may include read-only memory (ROM) or flash ROM. The non-volatile memory 220 preferably stores non-volatile memory NVM codes executed by the processing unit 210. The external storage device 250 may be a hard drive, magnetic drive, optical drive, portable drive, or nonvolatile memory drive. The drives and associated computer-readable media thereof (if required) provide nonvolatile storage of computer-readable instructions, data structures and program modules.

The RAM 230 has a mapping table 232 that has a plurality of table indices each identified with a calling address of a corresponding VM code in the RAM 230. The external storage device 250 stores codes for updating VM codes and the mapping table in the non-volatile memory.

The ROM 220 has at least one NVM code identified with one of the table indices. The CPU 210 obtains the calling address of the corresponding VM code according to the identified table index for executing the corresponding VM code. When the current address of the corresponding VM code has been changed, the calling address of the corresponding VM code is adjusted accordingly.

Figure 3:
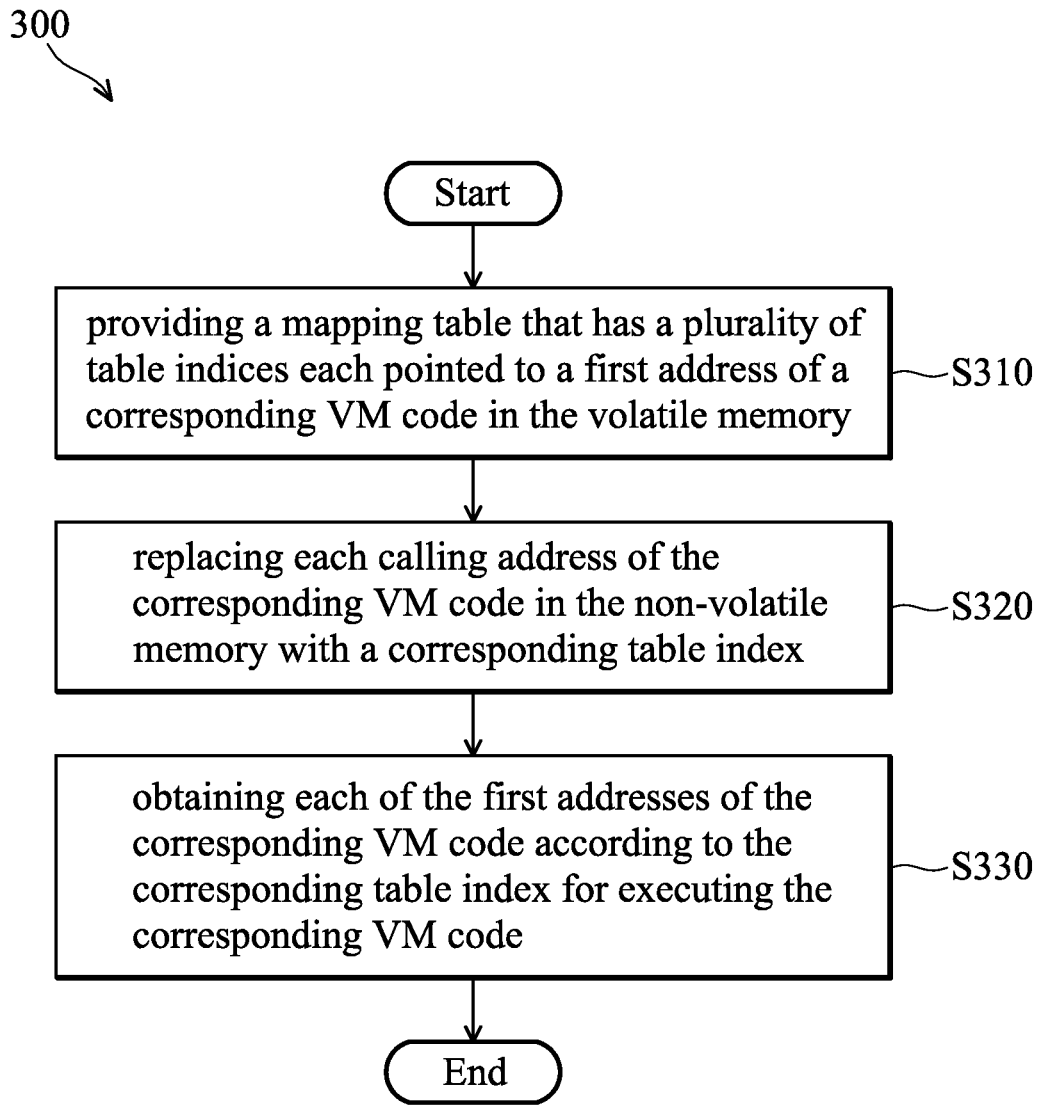
FIG. 3 is a flowchart of an embodiment of a data processing method for processing data between ROM and RAM according to the invention.

FIG. 3 is a flowchart of an embodiment of a data processing method for processing data between ROM and RAM according to the invention. In step S310, a mapping table is provided. Note that the mapping table is located in a predetermined area in the RAM. For example, the mapping table may be placed in the beginning part or top of the RAM, and is not limited thereto. The mapping table has a plurality of table indices and each table index identified with a calling address of a corresponding VM code is accessed by the ROM codes in the RAM. It is to be understood that the total number of table indices in the mapping table is substantially equal to the total number of the VM codes accessed in the ROM. For example, 10 table indices are presented in the mapping table if there are 10 VM codes accessed in the ROM. Each table index is identified with a calling address of a corresponding VM codes accessed in the ROM.

Figure 4A:
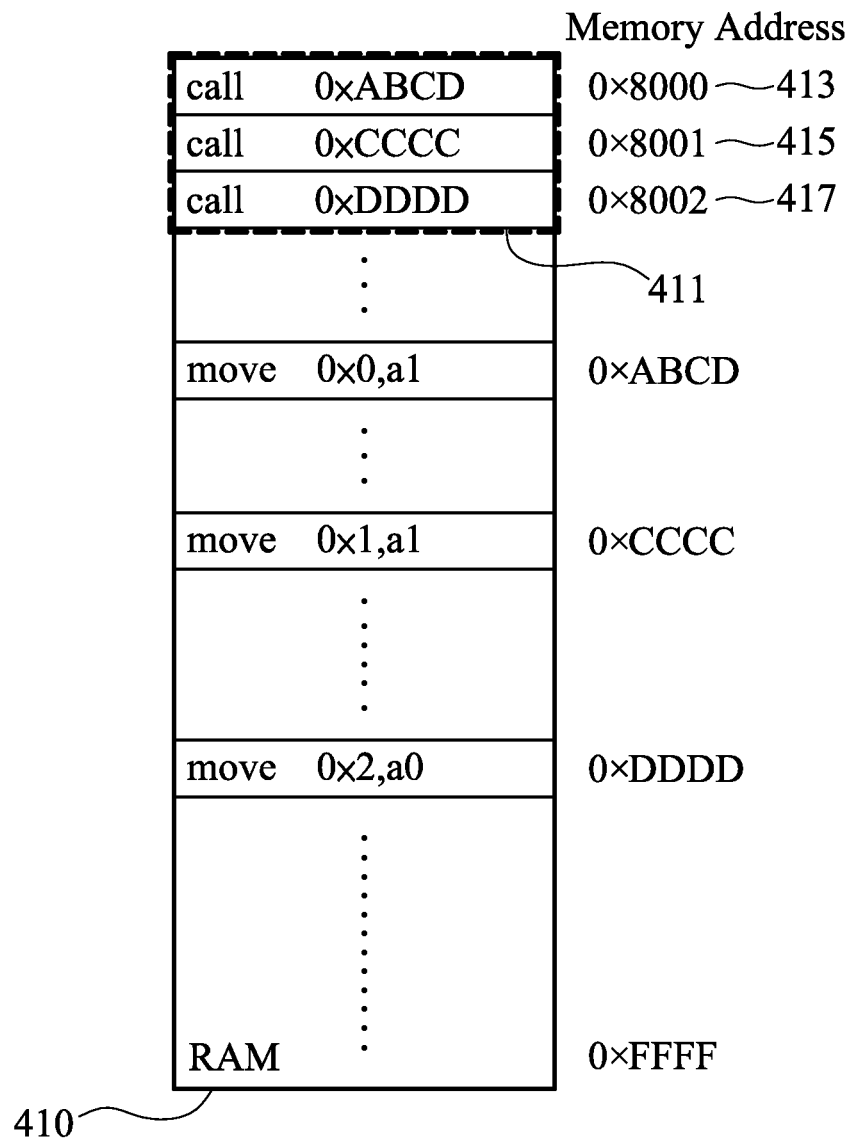
FIG. 4A shows an embodiment of a memory mapping in the RAM according to the invention.

FIG. 4A shows an embodiment of a memory mapping in the RAM according to the invention. It is assumed that VM codes in the RAM 410 are allocated from memory address 0x8000 to 0xFFFF and VM code A, B and C with calling address 0xABCD, 0xCCCC and 0xDDDD are accessed by the code in the ROM. As shown in FIG. 4A, in RAM 410, a mapping table 411 is located in the beginning part of the RAM memory addresses 0x8000. Three table indices 0x8000, 0x8001 and 0x8002 are used to store the current address of the VM codes A, B and C, respectively. For example, in this embodiment, three VM codes A, B and C are accessed by the codes in the ROM function so that the current address of these three functions 0xABCD, 0XCCCC and 0xDDDD are recorded in the mapping table 411 with a corresponding table index 0x8000 (413), 0x80001 (415) and 0x8002 (417) respectively. Once current address of any of the accessed RAM functions has been changed or modified, the corresponding address in the mapping table 411 will be updated accordingly. For example, the calling address of VM code A identified by the table index 0x8000 is 0xABCD and will be changed to 0xABCE if current calling address of the VM code A has been changed to 0xABCE. With the mapping table, correct calling address of the VM codes can be kept such that the VM codes can be successfully addressed and executed.

Figure 4B:
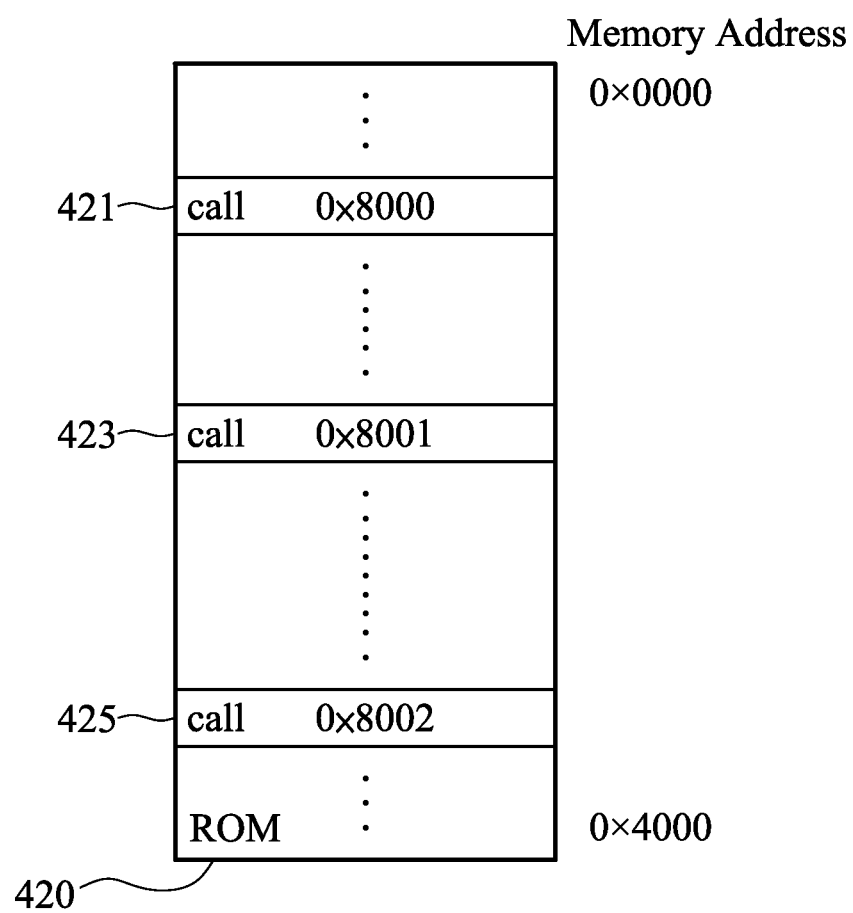
FIG. 4B shows an embodiment of a memory mapping in the ROM according to the invention.

After the mapping table has been established, in step S320, each calling address of the corresponding VM codes in the ROM is replaced with a corresponding table index. FIG. 4B shows an embodiment of a memory mapping in the ROM according to the invention. In ROM 420, the calling address of the VM codes A is replaced by the table index corresponding to the VM code A "0x8000" instead of "0xABCD" (as shown in 421). Similarly, the calling address of the VM codes B is replaced by the table index corresponding to the VM code B "0x8001" instead of "0xCCCC" (as shown in 423) and the calling address of the VM codes C is replaced by the table index corresponding to the VM code C "0x8002" instead of "0xDDDD" (as shown in 425). Therefore, when a RAM function is accessed by a ROM function, the calling address of the RAM function is replaced by a corresponding table index in the mapping table. Due to the table indices being fixed in a predetermined area, the mapping table can always be reached by the ROM function according to the table indices. Note that the ROM function will be fixed and unchanged after replacing the calling addresses of those RAM functions accessed by the ROM function to a corresponding table index.

After the mapping table has been provided and the calling addresses of the RAM function in the ROM have been replaced to a corresponding table index in the mapping table, in step S330, each of the calling addresses of the corresponding VM code can be obtained according to the corresponding table index for executing the corresponding VM code.

Figure 5:
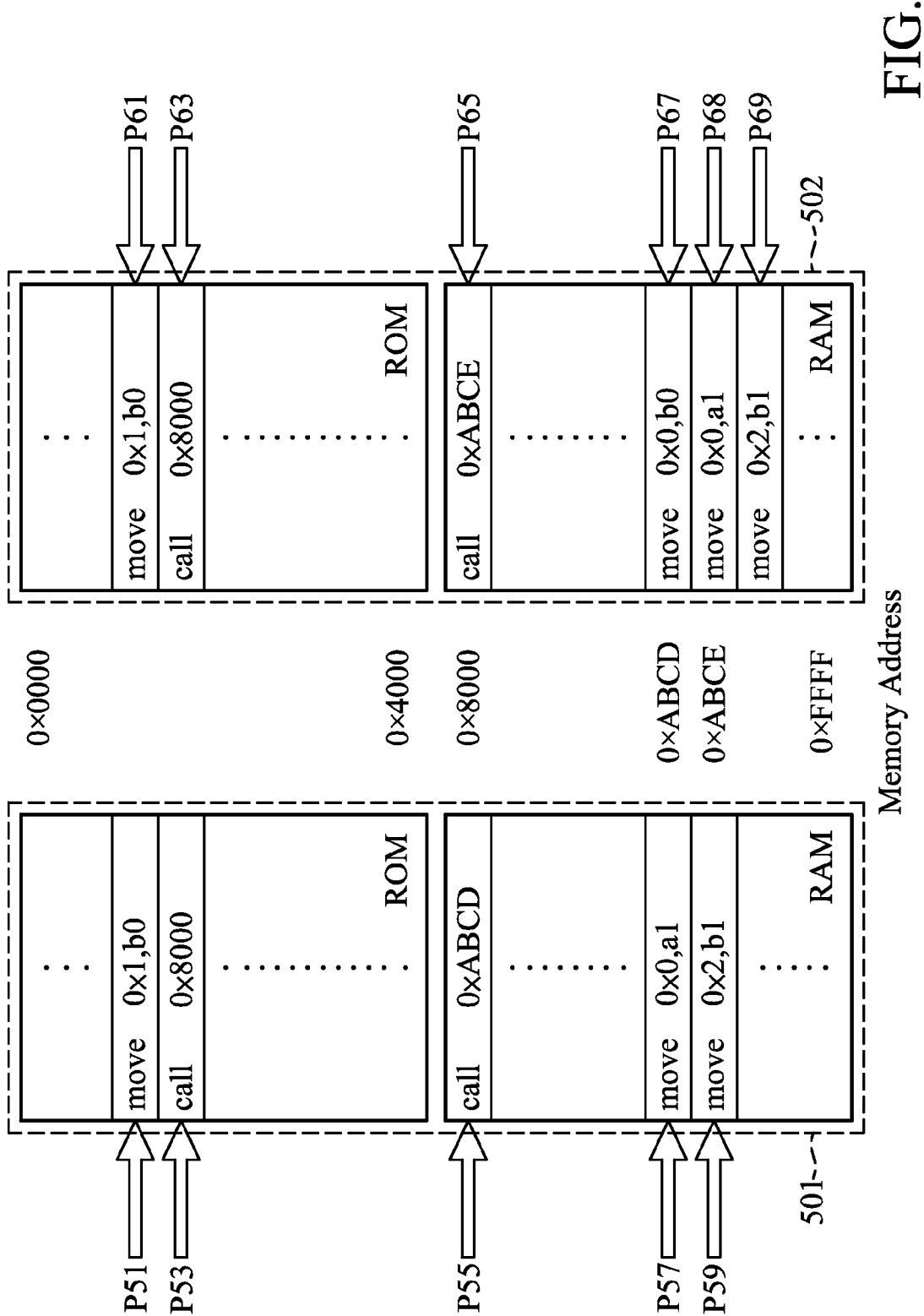
FIG. 5 shows another embodiment of a memory mapping for the ROM and RAM according to the invention.

FIG. 5 shows another embodiment of a memory mapping for the ROM and RAM according to the invention. Two memory configurations 501 and 502 are illustrated. Note that the ROM codes in the memory configuration 501 is same as that of memory configuration 501 while the RAM codes in the memory configuration 501 is different from that of memory configuration 502. It is observed that code "move 0x0, a1" is allocated on memory address 0xABCD in RAM of memory configuration 501 while it is allocated on memory address 0xABCE in RAM of memory configuration 502. In the memory configuration 501, the execution sequence is P51, P53, P55, P57 and P59, accordingly. When P53 is performed, it will call table index 0x8000 and thus P55 is then performed to obtain calling address of the accessed RAM function. When P55 is performed, it jumps to table index 0x8000 and finds that calling address of the accessed RAM function is 0xABCD. Therefore, it jumps to address 0xABCD for executing the accessed RAM function. After the execution, the result of the register b0, a1 and b1 are 1, 0 and 2, respectively.

Similarly, in the memory configuration 502, the execution sequence is PC61, P63, P65, P68 and P69, accordingly. When P63 is performed, it will call table index 0x8000 and thus P65 is then performed to obtain calling address of the accessed RAM function. When PC65 is performed, it jumps to table index 0x8000 and finds that calling address of the accessed RAM function is 0xABCE. Therefore, it jumps to address 0xABCE for executing the accessed RAM function. After the execution, the result of the register b0, a1 and b1 are 1, 0 and 2 respectively. It is observed that the step P67 will not be performed so the result is correct.

With the data processing method by the invention, if the current calling address of a RAM function has been changed, the calling address corresponding thereto stored in the mapping table will also be updated so that the RAM function accessed by the ROM function can be successfully accessed and executed. In addition, according to the data processing method of the invention, same ROM code can be used in RAMs with different memory configuration. In other words, according to the data processing method of the invention, an IC can have different RAM codes with a fixed ROM code.

In some embodiments, the invention can be applied in processing a NVM function. The NVM function has a plurality of NVM codes in the non-volatile memory such as a ROM function in the ROM. Part of the NVM function can be divided and located to the volatile memory, with the located address recorded as a calling address of a VM function in the mapping table with a specific table index. Then, the divided part can be treated as a RAM function and replaced by a code calling to the specific table index. Therefore, the divided part can be accessed by referring to the mapping table using the specific table index to obtain the located address of the divided part so as to execute it. After the execution of the divided part is finished, a "return" command may be used to return to the NVM function for further executions. The portion or divided part of the NVM function may be selected according to a specific rule such as selecting some frequently changed codes or parameters.

Figure 6:
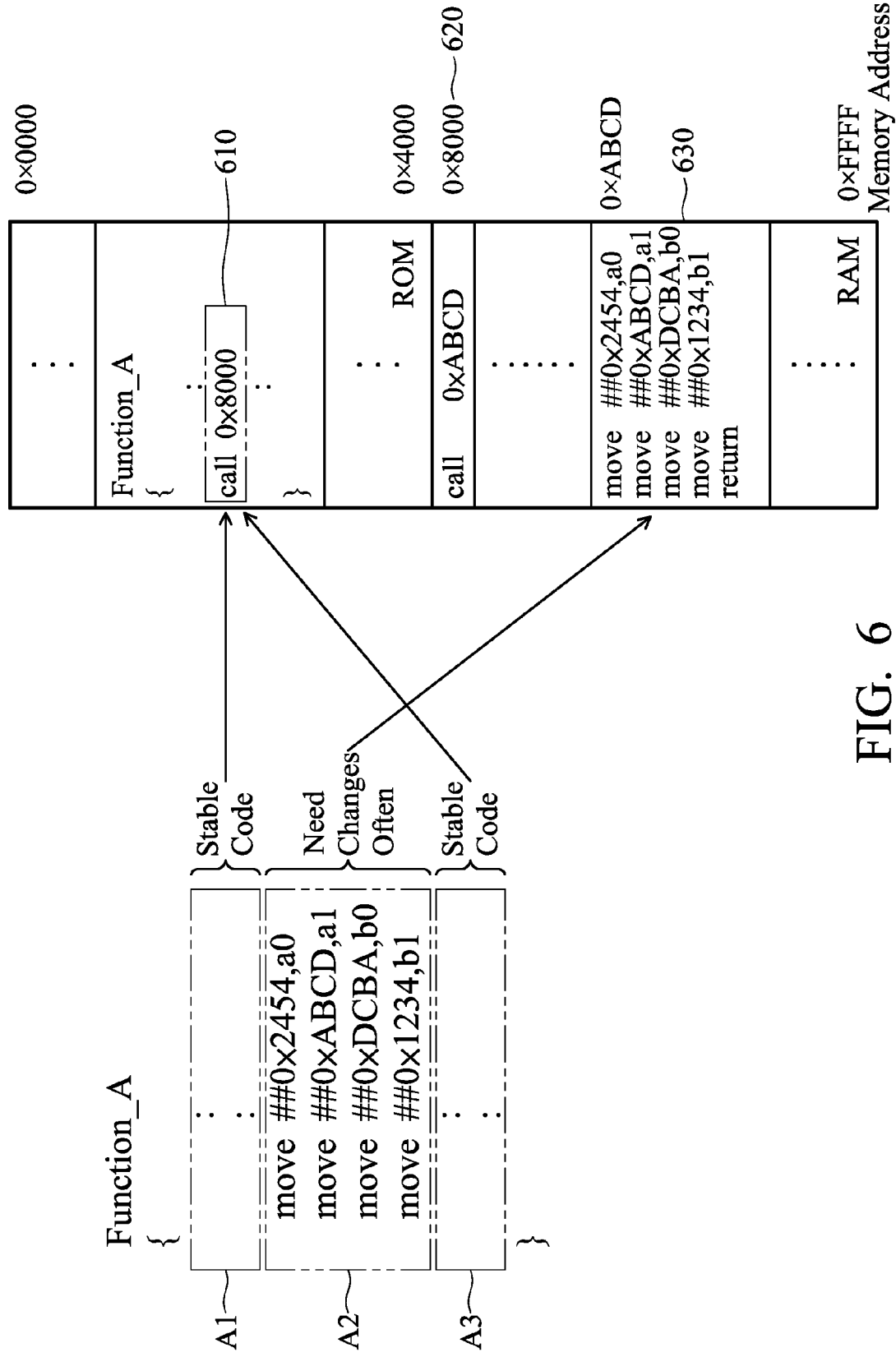
FIG. 6 is a schematic illustrating an embodiment of partitioning function in the ROM into ROM and RAM according to the invention.

FIG. 6 is a schematic illustrating an embodiment of partitioning a ROM function in the ROM into ROM and RAM according to the invention. As shown in FIG. 6, a ROM function Function_A is illustrated. The ROM function Function_A comprises three portions A1, A2 and A3 in which portion A1 and A3 are stable codes while portion A2 are codes which need to be changed often such as some parameter settings as shown in FIG. 6. Assume that the portion A2 is selected to be located in the RAM for easy modification and the located address of the A2 is 0xABCD. The located address of A2 is stored in the mapping table with a table index 0x8000 (as shown in 620). The ROM code corresponding to the portion A2 is replaced by calling to the table index 0x8000 (as shown in 610). When ROM function Function_A is being executed, portion A1 is first executed. Then, the table index of A2 "0x8000" is accessed and then located address of portion A2 is obtained to be the "0xABCD" from the mapping table using the table index "0x8000" so that the portion shown in 630 will be executed. At the end of the portion 630, a "return" command will force the portion A3 to be executed accordingly. With the aforementioned configuration in ROM and RAM, development of the ROM and RAM functions will be more flexible and efficient. It is to be understood that, in some embodiments, the aforementioned configuration in ROM and RAM of the invention may also be applied in interrupt service routines that handle a plurality of interrupt services by dividing some specific interrupt service routines to the RAM using the mapping table for flexible implementation, but it is not limited thereto.

In addition to application in a single apparatus, the invention may also be applied in multiple electronic apparatuses for processing data between ROM and RAM. In this case, configuration in ROM and RAM (comprising mapping table) for one apparatus may be copied or transferred to another via a connecting interface therebetween.

Figure 7:
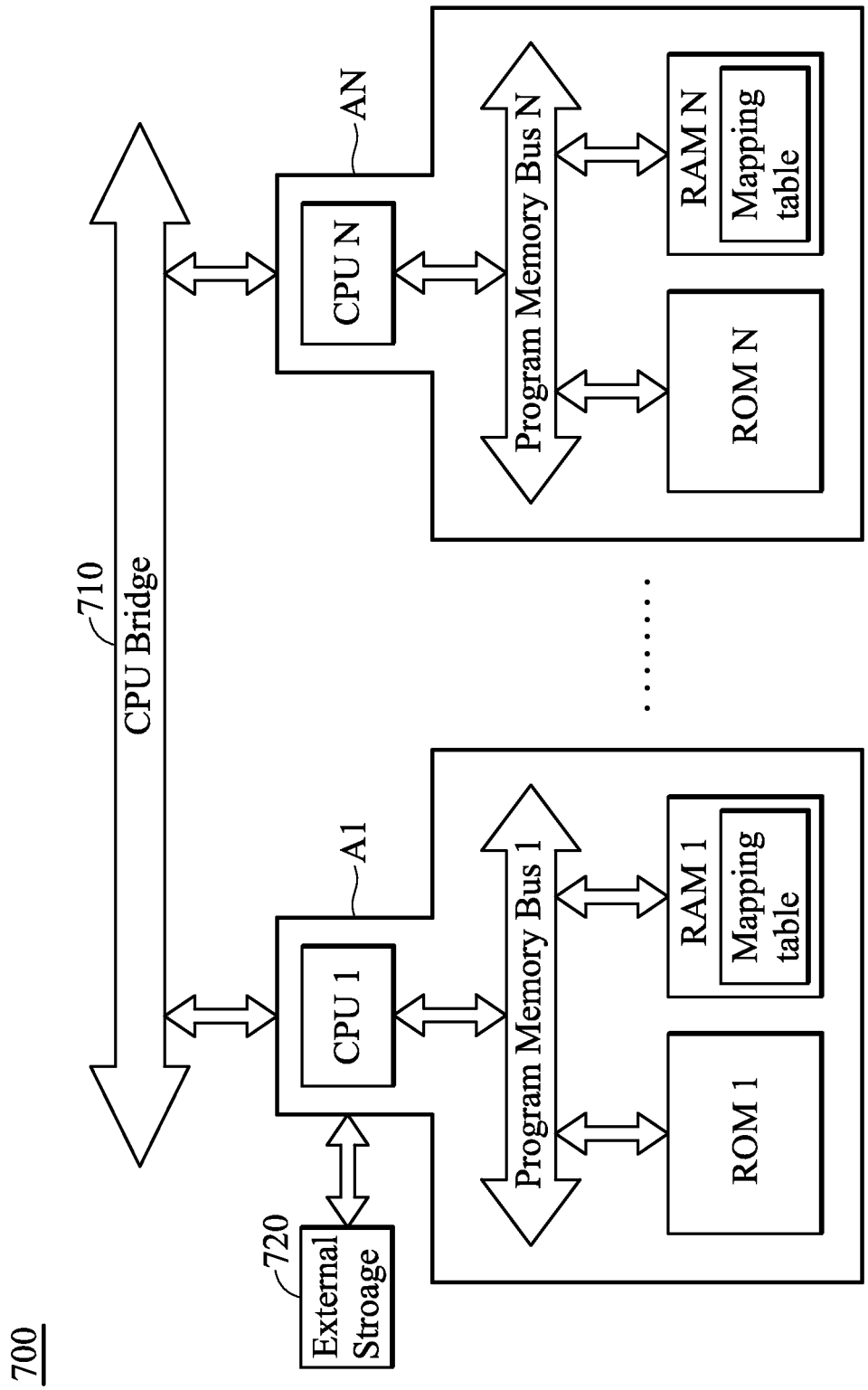
FIG. 7 is block diagram showing an embodiment of data processing method applied in multiple electronic apparatuses for processing data between ROM and RAM according to the invention.

FIG. 7 is block diagram 700 showing an embodiment of data processing method applied in multiple electronic apparatuses for processing data between ROM and RAM according to the invention.

As shown in FIG. 7, electronic apparatuses A1-AN are illustrated. It is assumed that the structure of each of the electronic apparatuses A1-AN is similar to the apparatus 200 shown in FIG. 2 except that external storage 720 is only connected to one of the electronic apparatuses such as A1 shown in FIG. 7. Thus, the apparatus A1 at least comprises a ROM1 and a RAM1 with a mapping table and the apparatus AN at least comprises a ROMN and a RAMN with a mapping table. The apparatus A1 is connectable to the apparatus AN via the CPU bridge 710 (e.g. RS232 interface). The external storage 720 may comprise an updated code for updating/filling the RAM codes in the RAM1 directly or updating/filling the RAM codes in the RAMN via the CPU bridge 710. Thus, each of the apparatus A1-AN connected to the CPU bridge 710 may apply the data processing method of the invention.

Using the processing method, currently calling address of the RAM function can be adjusted accordingly and modified in the mapping table so that the data in ROM and RAM can be successfully executed even when the RAM codes/functions have been modified, making data processing between data in ROM and RAM flexible and easy.

The data processing methods described can be stored in the memory of an electronic apparatus (e.g., set top box, DVD player, video recorders, etc.) as a set of instructions to be executed. In addition, the instructions to perform the method and decoding apparatus as described above can alternatively be stored on other forms of machine-readable media, including magnetic and optical disks, for example, on machine-readable media, such as magnetic disks or optical disks, accessible via a disk drive (or computer-readable medium drive). Further, the instructions can be downloaded into a computing device over a data network in a form of compiled and linked version.

Alternatively, the logic to perform the methods and apparatus as discussed, can be implemented in: additional computer and/or machine readable media, such as discrete hardware components as large-scale integrated circuits (LSI's), application-specific integrated circuits (ASIC's), firmware such as electrically erasable programmable read-only memory (EEPROM's); and electrical, optical, acoustical and other forms of propagated signals (e.g., carrier waves, infrared signals, digital signals, etc.); etc. Furthermore, the decoding apparatus as described above can be implanted on the same hardware component, such as a graphics controller that may or may not be integrated into a chipset device.

While the invention has been described by way of example and in terms of preferred embodiment, it is to be understood that the invention is not limited thereto. To the contrary, it is intended to cover various modifications and similar arrangements (as would be apparent to the skilled in the art). Therefore, the scope of the appended claims should be accorded to the broadest interpretation so as to encompass all such modifications and similar arrangements.

What is claimed is:

1. An electronic apparatus, comprising:
a random access memory (RAM) for storing a call transfer table, the call transfer table comprising at least one transferred address in the RAM;
a read-only memory (ROM), for storing at least one code to call one address of the call transfer table; and
a processing unit, for executing the code in the ROM and reading the call transfer table accordingly, then transferring to run the data in the transferred address of the RAM.

2. The electronic apparatus of claim 1, further comprising a connecting interface for the processing unit to access codes in the ROM and RAM.

3. The electronic apparatus of claim 2, further comprising an external storage device, storing codes for updating codes and the call transfer table in the RAM.

4. The electronic apparatus of claim 1, wherein the RAM is a volatile memory.

5. The electronic apparatus of claim 1, wherein the ROM is a non-volatile memory.

6. The electronic apparatus of claim 1, wherein the call transfer table is located in a predetermined area in the RAM.

7. The electronic apparatus of claim 6, wherein the electronic apparatus further couples to a second electronic apparatus having a second RAM that has a second call transfer table similar to the call transfer table and a second ROM through a second connecting interface, wherein codes in the second ROM are updated by codes stored in an external storage device of the electronic apparatus through the second connecting interface.

8. A data processing method for use in an electronic apparatus having a ROM and a RAM, said RAM storing a call transfer table comprising at least one transferred address in the RAM, comprising:
executing a ROM code to run data in an address of the call transfer table;
transferring to run a transferred address according to the call transfer table; and
running the data in the transferred address of the RAM.

9. The methods of claim 8, wherein the call transfer table is located in a predetermined area in the RAM.

10. The methods of claim 8, further comprising:
moving a portion of an NVM function that is in the ROM to the RAM, wherein the NVM function has a plurality of NVM codes; and
recording an address of the moved portion of the NVM function as a corresponding transferred address in the call transfer table.

11. The methods of claim 10, further comprising:
obtaining a calling address of the portion of the NVM function from the call transfer table according to the corresponding transferred address to run the portion of the NVM function.

12. The methods of claim 10, wherein the NVM function comprises interrupt service routines handling a plurality of interrupt services.

13. The methods of claim 12, wherein the portion of the NVM function is selected according to a specific rule.

14. The methods of claim 8, further comprising:
updating a first address of a corresponding VM code in the call transfer table when a current address of the corresponding VM code has been changed and a calling address of the corresponding VM code in the ROM is unchanged.

15. The method of claim 8, wherein the RAM is a volatile memory.

16. The method of claim 8, wherein the ROM is a non-volatile memory.

17. An addressing method for use in an electronic apparatus having a processing unit, a ROM and a RAM, comprising:
providing a call transfer table that has a plurality of table indices each identified with a first address of a corresponding VM code in the RAM;
addressing and executing at least one NVM code in the ROM identified with one of the table indices by referring to the identified table index to obtain the first address of the corresponding VM code, wherein the first address of the corresponding VM code is dynamically adjusted according to a current address of the corresponding VM code.

18. The method of claim 17, wherein the RAM is a volatile memory and the ROM is a non-volatile memory.

19. The method of claim 18, further comprising:
locating the call transfer table in a predetermined area in the volatile memory.

* * * * *